United States Patent
Kern et al.

(10) Patent No.: US 6,957,919 B2
(45) Date of Patent: Oct. 25, 2005

(54) DOUBLE-ROW ANGULAR CONTACT BALL BEARING

(75) Inventors: Roland Kern, Herzogenaurach (DE); Tino Beck, Burgebrach (DE); Helmut Schopplein, Stettfeld (DE)

(73) Assignee: INA-Schaeffler KG, (DE)

( * ) Notice: Subject to any disclaimer, the term of this patent is extended or adjusted under 35 U.S.C. 154(b) by 0 days.

(21) Appl. No.: 10/431,835

(22) Filed: May 8, 2003

(65) Prior Publication Data

US 2004/0028306 A1    Feb. 12, 2004

(30) Foreign Application Priority Data

Oct. 5, 2002  (DE) ............................... 102 20 689

(51) Int. Cl.⁷ ........................ F16C 19/08; F16C 33/40
(52) U.S. Cl. ...................... 384/526; 384/504; 384/510; 384/512
(58) Field of Search ................. 384/504, 510, 384/512, 523, 526, 528, 531

(56) References Cited

U.S. PATENT DOCUMENTS 4,723,851 A * 2/1988 Troster et al. ............... 384/523
5,199,801 A * 4/1993 Grehn et al. ................. 384/506

FOREIGN PATENT DOCUMENTS

| DE | 3027485 | 2/1982 |
|----|---------|--------|
| DE | 8329136 | 1/1984 |
| DE | 8405082 | 1/1985 |
| DE | 4037270 | 5/1992 |
| DE | 9412260 | 11/1994 |
| WO | 8503749 | 8/1985 |
| WO | 0012916 | 3/2000 |

* cited by examiner

Primary Examiner—Thomas R. Hannon
(74) Attorney, Agent, or Firm—Charles A. Muserlian

(57) ABSTRACT

In a double-row angular contact ball bearing comprising an outer ring (1), an inner ring (2) and two ball crown rings (3, 4) formed by bearing balls (3.1, 4.1) guided in two separate cages (3.2, 4.2) and supported on shoulders (1.1, 1.2, 2.1, 2.2) of said inner and outer rings, ball raceways of the bearing having different diameters, the cages (3.2, 4.2) are made of plastic and configured as window-type cages comprising pockets for receiving the bearing balls (3.1, 4.1), and one of the cages (3.2, 4.2) comprises on an axially inward oriented end, a plurality of spacers (3.5, 4.5) uniformly spaced from one another in peripheral direction, said one cage further comprises a plurality of retaining lugs (3.4, 4.4) uniformly spaced from one another in peripheral direction, which retaining lugs engage a corresponding groove (2.3, 1.3) of one of the inner (2) and the outer ring (1), and the spacers (3.5, 4.5) of the one cage (3.2, 4.2) prevent an axial displacement of the other cage (4.2, 3.2).

6 Claims, 5 Drawing Sheets

DOUBLE-ROW ANGULAR CONTACT BALL BEARING

FIELD OF THE INVENTION

The invention concerns a double-row angular contact ball bearing comprising an outer ring, an inner ring and cage-guided bearing balls supported on shoulders of said inner and outer rings, ball raceways of the bearing having different diameters.

BACKGROUND OF THE INVENTION

A double-row angular contact ball bearing of the pre-cited type is known from WO85/03749. The bearing shown in FIG. 2 of this earlier publication comprises an inner ring and an outer ring both of which have shoulders on which the ball rows are supported when a force is applied. Each of the ball rows is accommodated in a separate cage.

A drawback of this bearing is that when the outer ring is not in place, both the ball crown rings can slip off the inner ring in axial direction. But assembly conditions are conceivable in which, at first, one of the bearing rings has to be fixed on a shaft or in a housing while, at the same time, a retention of the rolling elements on this bearing component has to be assured till the bearing assembly can be completed by adding the missing part of the bearing.

OBJECTS OF THE INVENTION

It is an object of the invention to provide an improved rolling bearing of the pre-cited type whose assembly is substantially simplified.

This and other objects and advantages of the invention will become obvious from the following detailed description.

SUMMARY OF THE INVENTION

The invention achieves the above objects by the fact that both cages are made of plastic and configured as window-type cages comprising pockets for receiving the bearing balls, and one of the cages comprises on an axially inward oriented end, a plurality of spacers uniformly spaced from one another in peripheral direction, as also a plurality of retaining lugs uniformly spaced from one another in peripheral direction, which retaining lugs engage a corresponding groove of the inner or the outer ring, and the spacers of the one cage prevent an axial displacement of the other cage.

With this inventive configuration of the cage comprising spacers and retaining lugs it is assured that when one of the bearing rings is removed, neither of the two ball crown rings can fall off the bearing ring on which it is situated. This is achieved by the fact that on the one hand, the cage having the retaining lugs is anchored in the groove of the inner or outer ring and on the other hand, the spacer prevents the other cage from being displaced in axial direction out of the position it has taken relative to the raceway. The particular advantage of this is that, at first, an inseparable bearing sub-assembly can be formed out of the rolling elements and one of the bearing rings before the missing bearing component is added for forming the complete bearing assembly.

In one embodiment of the invention, the two ball crown rings have different pitch circle radii, the radially inward oriented spacers of the one cage overlap the other cage at least partially in radial direction, and the radially outward oriented retaining lugs engage the groove of the outer ring.

In another embodiment of the invention with a reversed arrangement, the two ball crown rings have different pitch circle radii, the radially outward oriented spacers of the one cage overlap the other cage at least partially in radial direction, and the radially inward oriented retaining lugs engage the groove of the inner ring.

In still another embodiment of the double-row angular contact ball bearing of the invention, the two ball crown rings have the same pitch circle radius, the radially outward oriented retaining lugs of the one cage engage the groove of the outer ring, and both cages are situated in the same radial plane.

In still another embodiment of the double-row angular contact ball bearing of the invention, the two ball crown rings have the same pitch circle radius, the radially inward oriented retaining lugs of the one cage engage the groove of the inner ring, and both cages are situated in the same radial plane.

According to a further, additional features of the invention, the bearing balls may have equal or different diameters.

According to still other features of the invention, the bearing rings may have the same or different axial lengths, and if they have the same axial length, the bearing rings are arranged axially offset to each other.

Finally, the angular contact ball bearing of the invention can be installed in an axle transmission of an automotive vehicle.

DETAILED DESCRIPTION OF THE DRAWINGS

Figure 1:
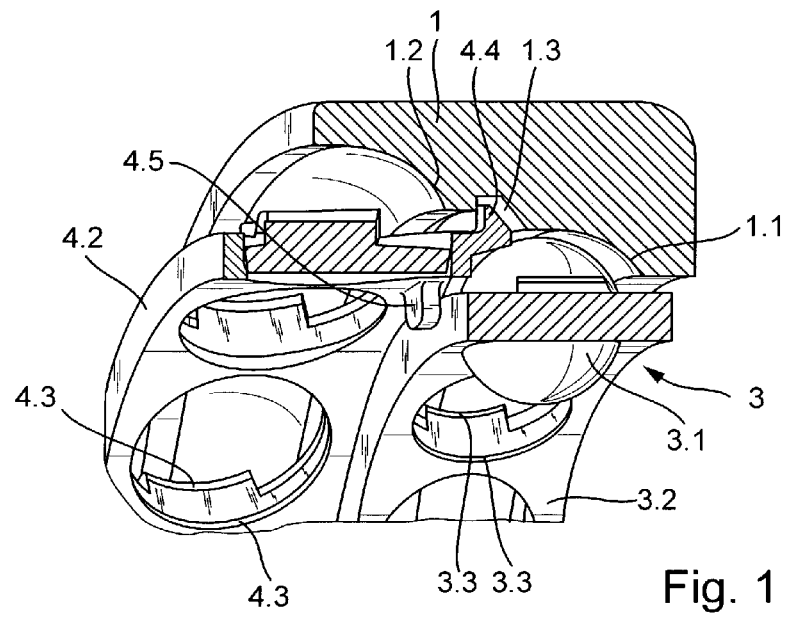
FIG. 1 shows a bearing arrangement of the invention, with retaining lugs snapped into a groove of the outer ring.
Figure 2:
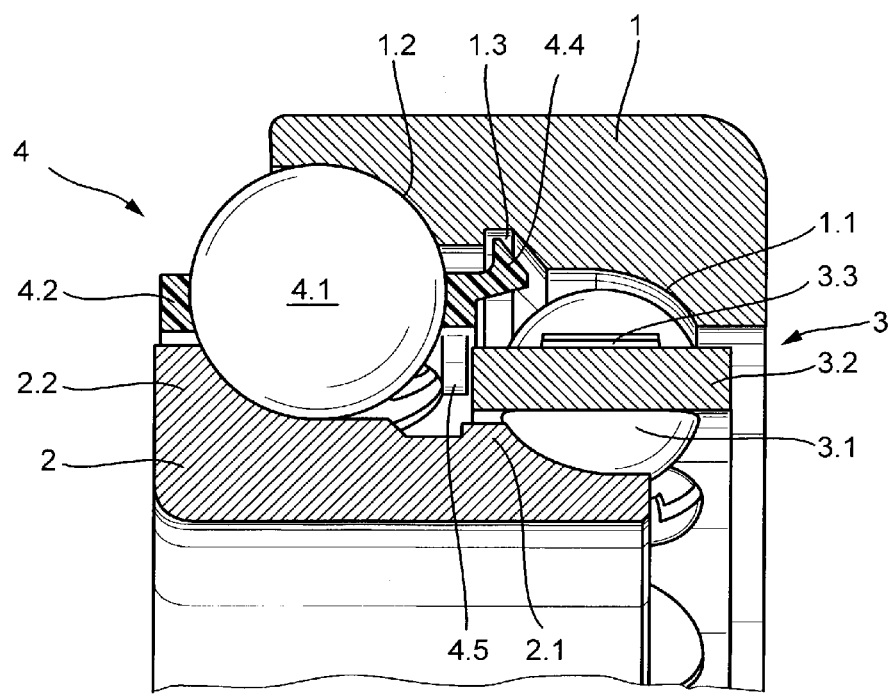
FIG. 2 shows a bearing arrangement of the invention, with retaining lugs snapped into a groove of the outer ring.

The bearing arrangement shown in FIGS. 1 and 2 comprises an outer ring 1 and an inner ring 2 between which ball crown rings 3, 4 made up of bearing balls 3.1, 4.1 and cages 3.2, 4.2 are arranged on associated raceways. Both cages 3.2, 4.2 comprise retaining elements 3.3, 4.3 that prevent an escape of the bearing balls 3.1, 4.1 in radially outward and radially inward direction from their respective cages 3.2, 4.2. Both bearing rings 1, 2 comprise shoulders 1.1, 1.2, 2.1, 2.2 against which the bearing balls 3.1, 4.1 bear. These figures also show that the two ball crown rings 3, 4 have different pitch circle radii and the ball raceways likewise have different diameters.

As can be seen further in FIGS. 1 and 2, the cage 4.2 of the invention is configured on its end oriented toward the interior of the bearing with a plurality of retaining lugs 4.4 that are uniformly spaced in peripheral direction and engage an associated groove 1.3 of the outer ring 1. The cage 4.2 further comprises a plurality of radially inward oriented spacers 4.5 that overlap the other cage 3.2 at least partially in radial direction. These spacers 4.5 of the cage 4.2 retain the ball crown ring 3 in its desired position relative to the raceway of the outer ring 1. The axial displacement path of the cage 3.2 relative to the cage 4.2 would be less than 1 mm. It is assured in this way that when the inner ring 2 is removed, as shown in FIG. 1, neither of the ball crown rings 3, 4 can fall off the outer ring 1. Thus, the assembling of the complete bearing is substantially simplified.

Figure 3:
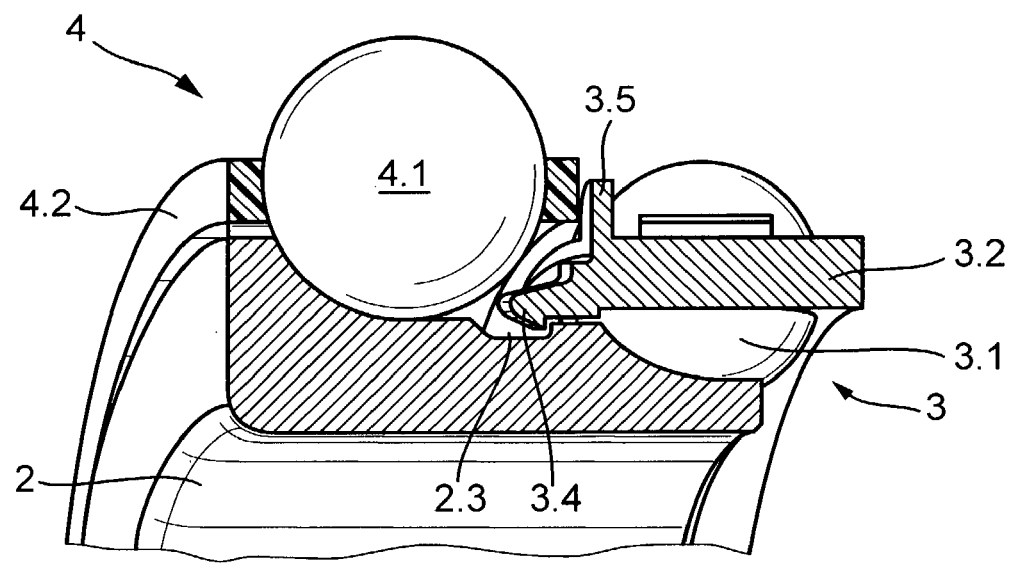
FIG. 3 shows a bearing arrangement of the invention, with retaining lugs snapped into a groove of the inner ring.
Figure 4:
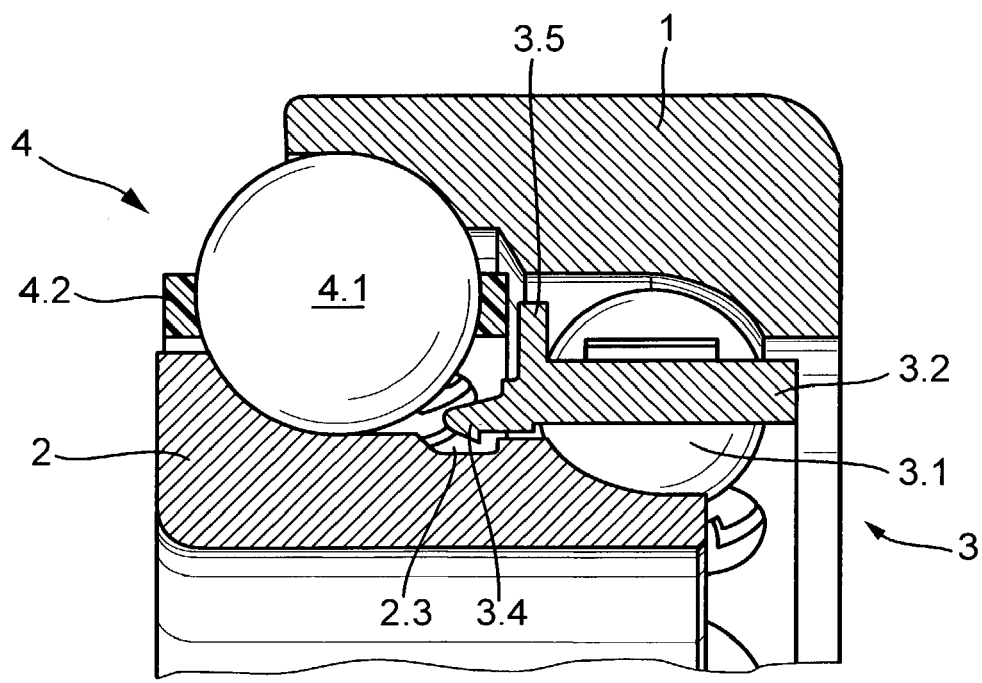
FIG. 4 shows a bearing arrangement of the invention, with retaining lugs snapped into a groove of the inner ring.
Figure 5:
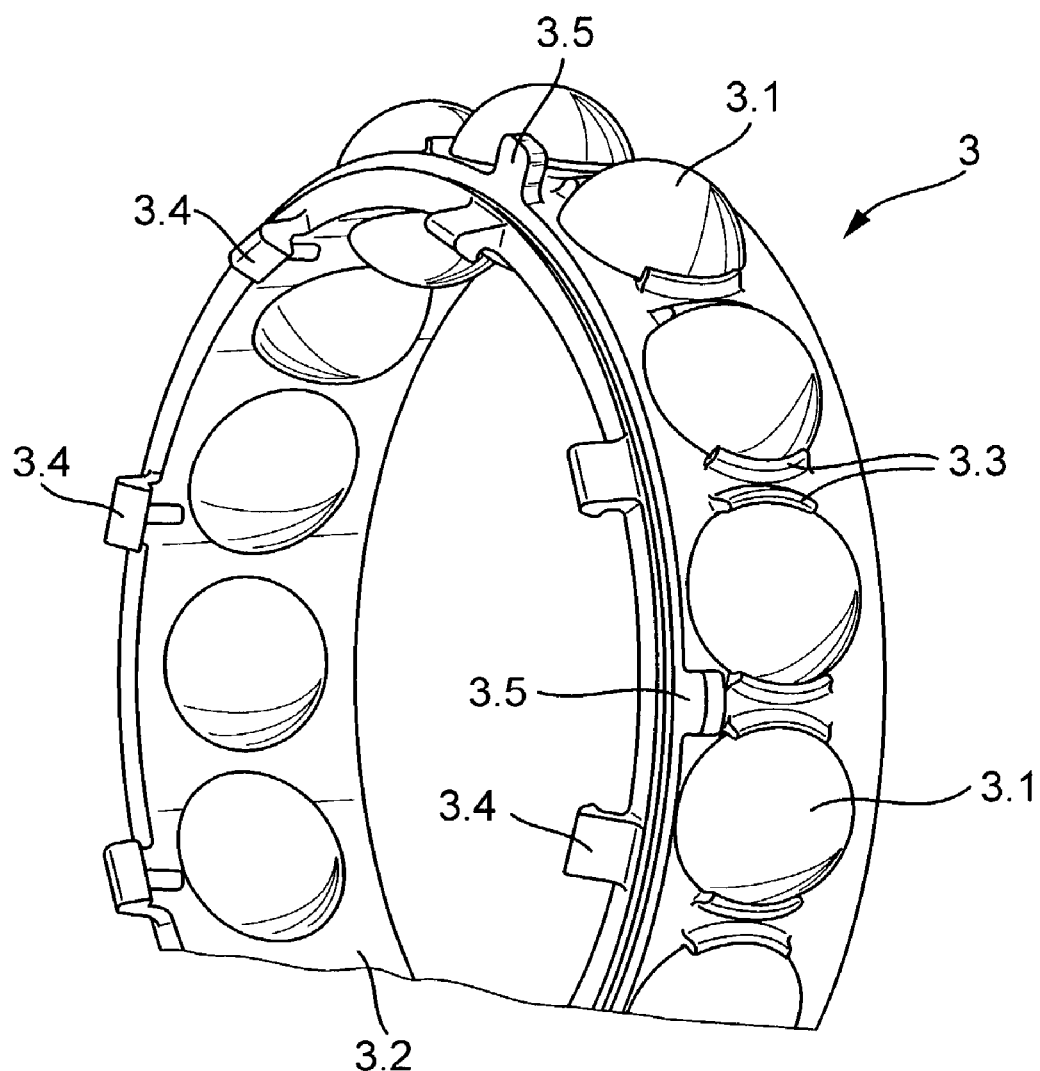
FIG. 5 is a perspective representation of a cage configured in accordance with the invention.

FIGS. 3, 4 and 5 show another embodiment of the bearing arrangement and cage 3.2 of the invention in which the ball crown rings 3, 4 are retained on the inner ring 2. To this end, the cage 3.2 is configured on its end oriented toward the interior of the bearing with a plurality of retaining lugs 3.4 that are uniformly spaced in peripheral direction and engage into an associated groove 2.3 of the inner ring 2. The cage 3.2 further comprises a plurality of radially outward oriented spacers 3.5, uniformly spaced from one another in peripheral direction, that overlap the cage 4.2 at least partially in radial direction and thus prevent its axial displacement. In this way, an inseparable bearing sub-assembly is formed out of the components 2, 3, 4 that is simple to handle and can be completed later by adding the missing outer ring 1.

Figure 6:
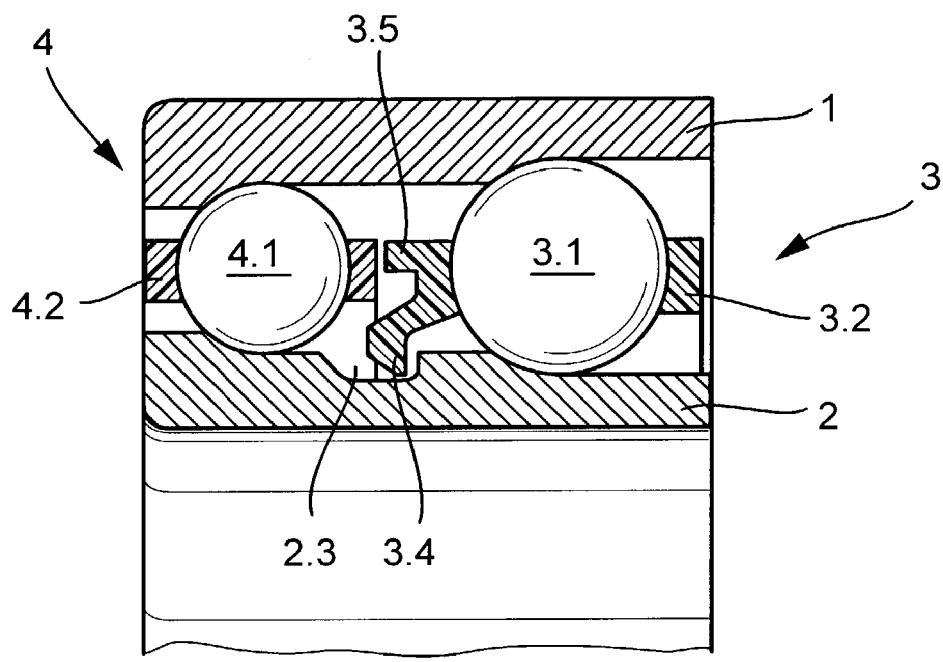
FIG. 6 is a longitudinal section through a bearing arrangement of the invention in which the two ball crown rings have the same pitch circle radius.

FIG. 6 shows a bearing arrangement of the invention in which the ball crown rings 3, 4 have the same pitch circle radius but the bearing balls 3.1, 4.1 have different diameters. Both the cages 3.2, 4.2 are arranged in approximately the same radial plane, the cage 3.2 being provided with retaining lugs 3.4 that engage the groove 2.3 of the inner ring 2. Thus, it is assured that when the outer ring 1 is removed, the ball crown rings 3 and 4 cannot fall off the inner ring 2. It is equally possible to reverse the arrangement of the retaining lugs 3.4 of the cage 3.2 so that they engage a groove of the outer ring 1. In contrast to the bearing arrangements shown in FIGS. 1 to 4, the spacers 3.5 of this embodiment are oriented in axial direction because both the cages 3.2, 4.2 are situated in the same radial plane.

Figure 7:
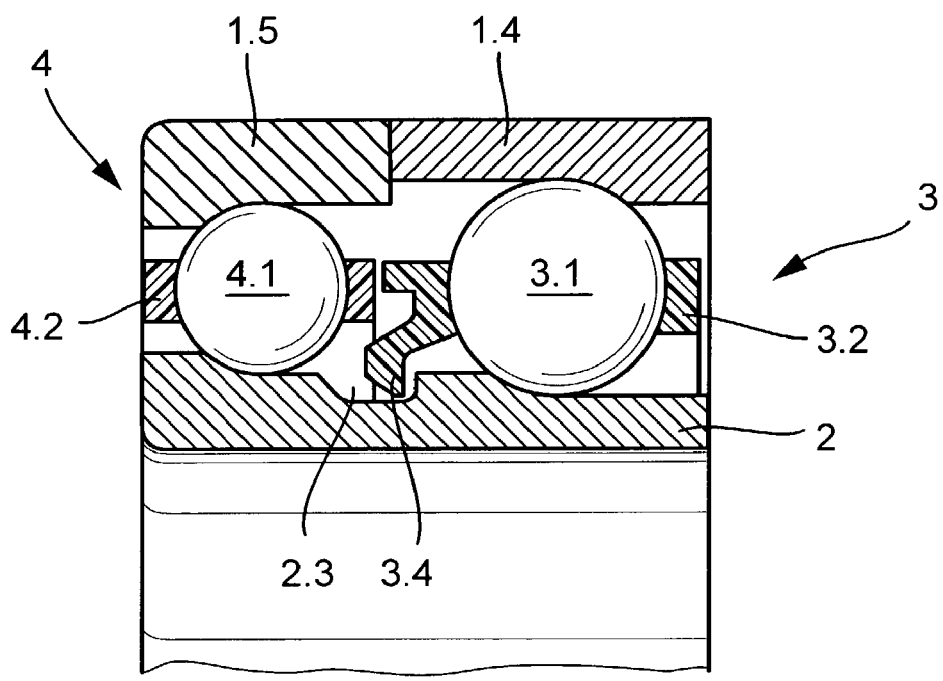
FIG. 7 is a longitudinal section through a bearing arrangement of the invention in which the two ball crown rings have the same pitch circle radius.

As shown in FIG. 7, on the side opposite the snapped connection, the outer ring can have a two-piece configuration comprising the two part rings 1.4, 1.5 whose shoulders are arranged in opposing relationship.

Figure 8:
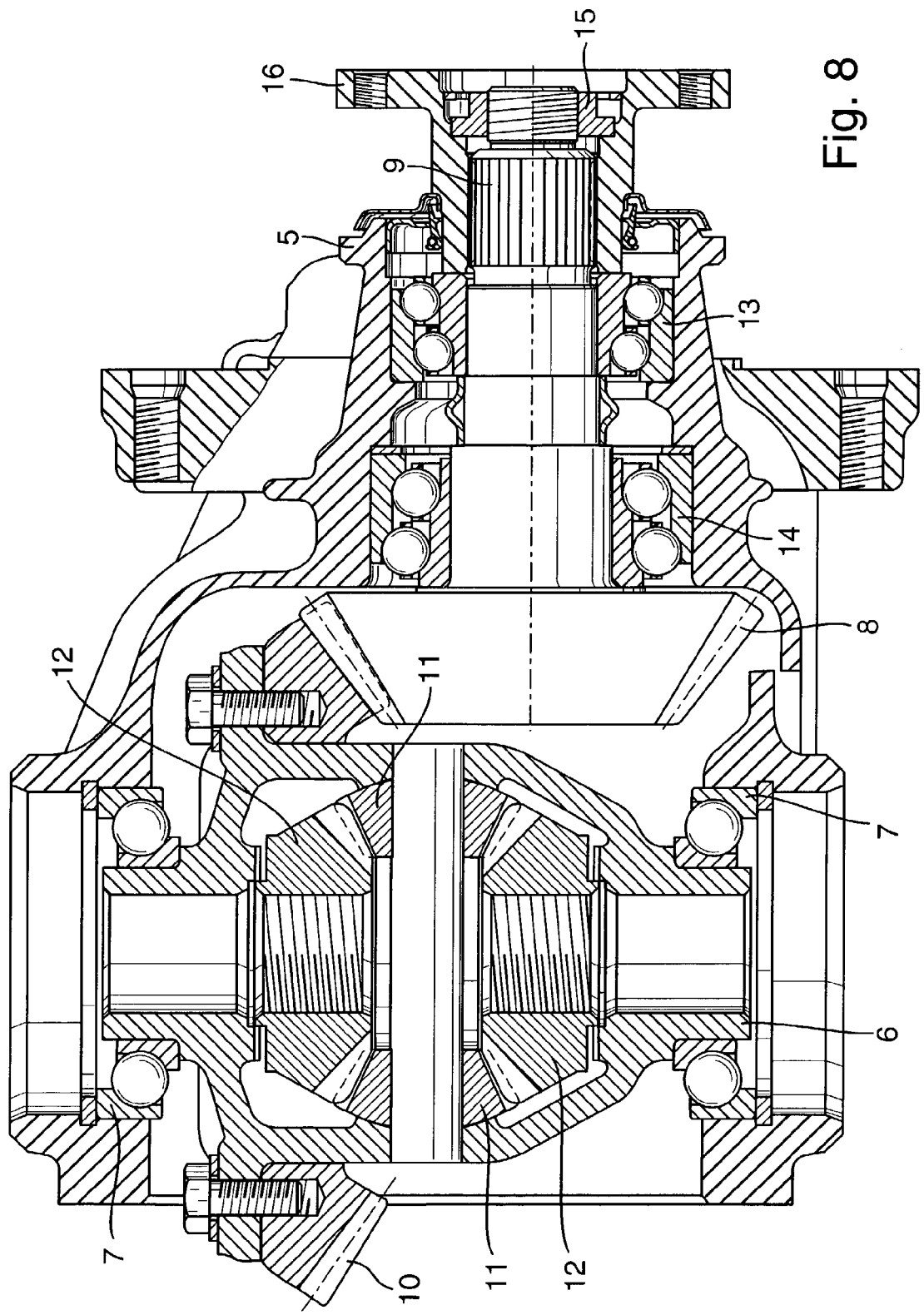
FIG. 8 is a longitudinal section through an axle transmission for an automotive vehicle.

The automotive axle transmission illustrated in FIG. 8 comprises a housing 5 in which a differential gearing 6 is mounted on two angular contact ball bearings 7. A bevel pinion 8 of a bevel pinion shaft 9 drives a crown wheel 10 that in its turn actuates the differential gearing 6. The differential gearing 6 is connected through differential gears 11 and driven gears 12 to respective axle shafts, not shown, that drive wheels, also not shown. The bevel pinion shaft 9 is retained in the housing 5 by two spaced double-row angular contact ball bearings 13, 14 whose inner rings are moved toward each other by the hub 16 under the action of a threaded element 15, that is to say, the ball bearings are pre-stressed. Both the angular contact ball bearings 13, 14 are configured in accordance with the invention with their ball crown rings being fixed at first by their cages on the inner rings of the bearings before the bevel pinion shaft 9 and the housing 5 with pressed-in outer bearing rings are assembled together to complete the axle transmission.

What is claimed is:

1. A double-row angular contact ball bearing comprising an outer ring, an inner ring and two ball crown rings formed by bearing balls guided in two separate cages and supported on shoulders of said inner and outer rings, ball raceways of the bearing having different diameters, wherein the cages are made of plastic and configured as window-type cages comprising pockets for receiving the bearing balls, and one of the cages comprises on an axially inward oriented end, a plurality of spacers uniformly spaced from one another in peripheral direction, said one cage further comprises a plurality of retaining lugs uniformly spaced from one another in peripheral direction, which retaining lugs engage a corresponding groove of one of the inner and the outer ring, and the spacers of the one cage prevent an axial displacement of the other cage, the two ball crown rings have different pitch circle radii, the spacers of the one cage are oriented radially inward and overlap the other cage at least partially in radial direction, while the retaining lugs are oriented radially outward and engage the groove of the outer ring.

2. A double-row angular ball bearing of claim 1, wherein the bearing balls have different diameters.

3. A double-row angular contact ball bearing of claim 1, wherein the pockets of the cages comprise retaining elements.

4. A double-row angular contact ball bearing of claim 1, wherein the bearing rings have the same axial length.

5. A double-row angular contact ball bearing of claim 1, wherein the bearing rings have the same length and are arranged axially offset to each other.

6. A double-row angular contact ball bearing comprising an outer ring, an inner ring and two ball crown rings formed by bearing balls guided in two separate cages and supported on shoulders of said inner and outer rings, ball raceways of the bearing having different diameters, wherein the cages are made of plastic and configured as window-type cages comprising pockets for receiving the bearing balls, and one of the cages comprises on an axially inward oriented end, a plurality of spacers uniformly spaced from one another in peripheral direction, said one cage further comprises a plurality of retaining lugs uniformly spaced from one another in peripheral direction, which retaining lugs engage a corresponding groove of one of the inner and the outer ring, and the spacers of the one cage prevent an axial displacement of the other cage, the two ball crown rings have the same pitch circle radius, the retaining lugs of the one cage are oriented radially outward and engage the groove of the outer ring, both cages being situated in a same radial plane.

\* \* \* \* \*